United States Patent Office 2,985,660
Patented May 23, 1961

2,985,660

5-HETEROCYCLIC-5H-DIBENZO [a,d] CYCLOHEPTENES

Claude I. Judd, Thiensville, and Alexander E. Drukker and John H. Biel, Milwaukee, Wis., assignors to Lakeside Laboratories, Inc., Milwaukee, Wis., a corporation of Delaware No Drawing. Filed Apr. 29, 1960, Ser. No. 25,533

8 Claims. (Cl. 260—293)

This invention relates to novel chemical compounds and processes of preparing the same. More particularly, this invention is concerned with novel basic dibenzsuberene derivatives and processes of producing such compounds.

According to the present invention there are provided novel basic 5H-dibenzo[a, d]-cycloheptene derivatives of the formula

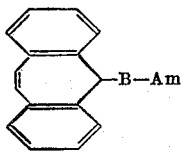

and acid addition and quaternary ammonium salts thereof, wherein B is a single chemical bond or a lower straight or branched alkylene advisably of 1 to 5 carbons such as methylene, ethylene and propylene and Am is a heterocyclic amino group bonded through a nuclear carbon to B, including such heterocyclic groups as N-lower alkyl-2,3 or 4-piperidyls such as N-methyl-3-piperidyl, N-ethyl-4-piperidyl, N-ethyl-2-piperidyl and N-isopropyl-3-piperidyl, N-(di-lower alkyl amino-lower alkyl)-2,3 or 4-piperidyls such as N-(beta-dimethylaminopropyl)-4-piperidyl, N-(beta-diethylaminoethyl)-3-piperidyl and N-(dimethylaminopropyl)-2-piperidyl, N-phenyl-lower alkyl-3 or 4 piperidyls such as N-benzyl-3-piperidyl, N-phenylethyl-4-piperidyl and N-phenylpropyl-3-piperidyl, 2-piperidyl, 3-piperidyl and 4-piperidyl, 2-pyrrolidyl, 3-pyrrolidyl, N-lower alkyl-2 or 3-pyrrolidyls such as N-methyl-2-pyrrolidyl, N-ethyl-3-pyrrolidyl, N-propyl-4-pyrrolidyl, N-phenyl-lower alkyl-2 or 3-pyrrolidyls such as N-benzyl-2-pyrrolidyl and N-phenylethyl-3-pyrrolidyl, 4-quinuclidyl, 3-quinuclidyl, 2-quinuclidyl, N-lower alkyl-2, 3 or 4-quinuclidyl and N-phenyl-lower alkyl-2, 3 or 4-quinuclidyl. B is an alkylene group when Am is attached to a 2-piperidyl, 2-pyrrolidyl or 2-quinuclidyl moiety, with or without a substituent on the nitrogen.

Some of the compounds of this invention can be produced by reacting an alkyali metal salt of 5H-dibenzo[a, d]-cycloheptene with the appropriate heterocyclic halide or heterocyclic alkyl halide. This process can be represented as follows:

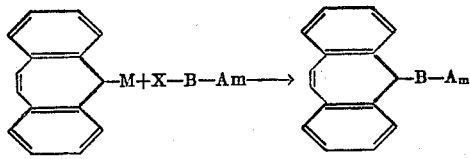

wherein M is an alkyli metal and particularly lithium, sodium or potassium, X is a reactive halogen and particularly chlorine, bromine or iodine, and B and Am have the significance previously assigned but Am represents only N-substituted heterocyclic groups, i.e., those with a tertiary nitrogen.

The alkali metal 5H-dibenzo[a, d]-cycloheptene salt used as a reactant can be prepared by reacting 5H-dibenzo[a, d]-cycloheptene with an alkali metal alkyl or aryl compound such as butyl lithium, phenyl lithium, propyl sodium and butyl potassium. The reaction is readily effected by bringing the reactants together in an inert anhydrous high boiling liquid reaction medium such as xylene, toluene, tetralin, cumene and tetrahydrofuran. The reaction can be effected at room temperature or elevated temperatures, depending on the reactivity of the alkali metal compound used in the process. The reaction is substantially complete in 1 to 4 hours. Following termination of the reaction the product can be isolated, if desired, but this is ordinarily not done since it can be used at present in the reaction mixture in the next step.

Reaction between the alkali metal salt of 5H-dibenzo[a, d]-cycloheptene and the N-substituted heterocyclic halide or heterocyclic alkyl halide can be effected by bringing the reactants together in a suitable inert high boiling liquid reaction medium such as dioxane, toluene, xylene, ethyl ether, tetralin, cumene and tetrahydrofuran. The reaction mixture from the formation of the alkali metal 5H-dibenzo[a, d]-cycloheptene can be used as the reactant and solvent source to which the appropriate heterocyclic halide or heterocyclic alkyl halide reactant can be added. The reaction proceeds at room temperature although slightly elevated temperatures can also be used. About 3 to 20 hours is generally adequate to substantially complete the reaction. After the reaction is terminated the product can be recovered by filtering the reaction mixture, distilling off the solvent and fractionally distilling the high boiling base in vacuo.

Among the N-substituted heterocyclic halides and N-substituted heterocyclic alkyl halides which can be used in the process are N-methyl-3-chloropiperidine,
N-ethyl-4-bromopiperidine,
N-benzyl-3-chloropiperidine,
N-benzyl-4-chloropiperidine,
N-phenylpropyl-3-bromopiperidine,
N-methyl-3-chloropyrrolidine,
N-benzyl-3-bromopyrrolidine,
N-isopropyl-4-bromopyrrolidine,
N-phenylisopropyl-3-pyrrolidine,
N-(beta-diethylaminoethyl)-3-chloropiperidine,
N-(dimethylaminoethyl)-4-bromopiperidine,
4-chloroquinuclidine,
N-methyl-2-(2-chloroethyl)piperidine,
N-ethyl-3-chloromethylpiperidine,
N-benzyl-4-(3-bromopropyl)piperidine,
N-ethyl-2-(2-chloroethyl)pyrrolidine,
N-benzyl-3-chloromethylpyrrolidine and
N-benzyl-4-chloromethylquinuclidine.

Some of the compounds which are produced according to this process are:

5-(N-methyl-4-piperidyl)-5H-dibenzo[a, d]cycloheptene
5-(N-ethyl-3-piperidyl)-5H-dibenzo[a, d]cycloheptene
5-(N-benzyl-3-piperidyl)-5H-dibenzo[a, d]cycloheptene
5-(N-benzyl-4-piperidyl)-5H-dibenzo[a, d]cycloheptene
5-(N-ethyl-3-pyrrolidyl)-5H-dibenzo[a, d]cycloheptene
5-(N-benzyl-3-pyrrolidyl)-5H-dibenzo[a, d]cycloheptene
5-(N-phenethyl-3-pyrrolidyl)-5H-dibenzo[a, d]cycloheptene
5-[(N-ethyl-3-piperidyl)methyl]-5H-dibenzo[a, d]cycloheptene
5-[2-(N-benzyl-4-piperidyl)ethyl]-5H-dibenzo[a, d]cycloheptene
5 - [3-(N-ethyl-2-pyrrolidyl)propyl]-5H-dibenzo[a, d]cycloheptene
5-[4-(N-benzyl-3-pyrrolidyl)butyl]-5H-dibenzo[a, d]cycloheptene 5-[2-(N-ethyl-4-quinuclidyl)ethyl]-5H-dibenzo[a, d]cycloheptene, and 5-(N-benzyl-4-quinuclidyl)-5H-dibenzo[a, d]cycloheptene.

The compounds of the formulae

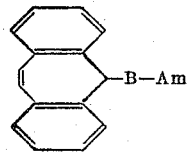

in which B and Am have the significance previously assigned but Am is a heterocyclic group containing a secondary nitrogen in the ring, can be produced by subjecting the corresponding compounds containing a benzyl group on the nitrogen of the heterocyclic group to catalytic reductive cleavage to remove the benzyl group. This can be illustrated by the compounds in which Am is an N-benzyl-3-piperidyl as follows:

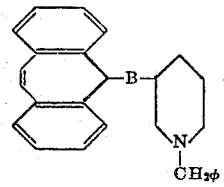

which upon being subjected to catalytic cleavage forms the compounds

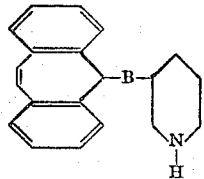

in which B has the assigned significance and $\phi$ is phenyl.

The catalytic reductive cleavage of the benzyl group is readily effected by adding the appropriate N-benzyl piperidyl, pyrrolidyl or quinuclidyl dibenzosuberene derivative, advisably as an acid addition salt, to a solvent such as water or a lower alcohol, adding a catalyst such as palladium, and hydrogen under pressure, as up to about 100 p.s.i. A small amount of glacial acetic acid is generally included to promote the reaction. The hydrogenation proceeds quickly and its progress can be measured by the hydrogen uptake. When the hydrogen uptake ceases the reaction can be considered completed. After filtering the reaction mixture it can be evaporated to dryness and the product triturated with a solvent such as ether and separated by filtration.

Some of the compounds produced in this way from the corresponding N-benzyl intermediates are:

5-(4-piperidyl)-5H-dibenzo[a, d]cycloheptene
5-(3-piperidyl)-5H-dibenzo[a, d]cycloheptene
5-(3-pyrrolidyl)-5H-dibenzo[a, d]cycloheptene
5-(4-quinuclidyl)-5H-dibenzo[a, d]cycloheptene
5-[(3-pyridyl)methyl]-5H-dibenzo[a, d]cycloheptene
5-[3-(2-pyrrolidyl)propyl]5H-dibenzo[a, d]cycloheptene and
5-[2-(4-piperidyl)ethyl]-5H-dibenzo[a, d]cycloheptene Acid addition salts of the compounds of this invention can be produced by contacting the suberene derivatives with a suitable inorganic or organic acid such as hydrochloric, sulfuric, phosphoric, maleic, benzoic, tartaric, succinic, fumaric, methane sulfonic, and citric acid in a suitable solvent such as methanol, ethanol, isopropanol, ethyl acetate and acetonitrile. The salts form readily at room temperature and can be separated by conventional methods.

These compounds, as the free bases and nontoxic acid addition salts thereof, are central stimulants and antispasmodic agents in animals. The compounds thus can be used in depression and mild gastrointestinal disturbances.

For obtaining the described activities the compounds can be administered in combination with a suitable pharmaceutical carrier and advisably in a unit dosage form such as a tablet or capsule. The oral route of administration is preferred.

The compounds of this invention can also be used as neutralizing agents and in the isolation of penicillin from fermentation broths.

The following example is presented to illustrate the preparation of a compound within the invention.

EXAMPLE 5-(N-methyl-4-piperidyl)-5H-dibenzo[a, d]cycloheptene and maleate thereof A one liter 3-neck round bottom flask was charged with a solution of 19.2 g. (0.1 mole) of dibenzosuberene in 150 cc. of tetrahydrofuran. The solution was covered with nitrogen, cooled in ice water, and, while stirring, a solution of 64 cc. of butyllithium solution (15.4%, 0.11 mole) in 100 cc. of ether was added dropwise in 30 min. A dark brown color developed and the solution was stirred for 4 hrs. at room temperature. Then there was added in 15 min. a solution of 13.34 g. (0.1 mole) of N-methyl-4-chloropiperidine in 60 cc. of dry ether, giving a slightly exothermic reaction. The solution was stirred at room temperature for 6 hrs. and the brown color disappeared and LiCl began to form. The salt was filtered off and the solution was taken to dryness. The residue was extracted with ether and ethereal HCl was added to the extract. The hydrochloride salt was separated, dissolved in water and the aqueous solution was made alkaline. The yellow brown base was extracted with ether, dried, filtered and the solvent was removed by distillation. The 21 g. residue was distilled without a column, using a free flame and 15.6 g. (54%) collected, B.P. 190° (0.08 mm.).

To a solution of 4.25 g. of the base in 250 cc. of ether was added a solution of 2.0 g. of maleic acid in 10 cc. of alcohol and 50 cc. of ether. A white solid formed, which was filtered and dried. Yield 4.8 g., M.P. 189–192° C. After recrystallization from 20 cc. of ethanol the yield was 3.7 g., M.P. 195–196° C.

Assay calcd. for $C_{25}H_{27}NO_4$: C, 74.05; H, 6.71; N, 3.45. Found: C, 73.86; H, 6.61; N, 3.43.

Various changes and modifications of the invention can be made and, to the extent that such variations incorporate the spirit of this invention, they are intended to be included within the scope of the appended claims.

What is claimed is:

1. A member of the group consisting of compounds of the formulae

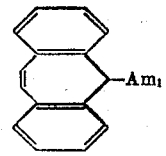

and

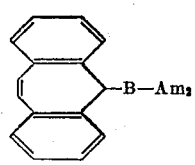

and nontoxic pharmaceutically acceptable acid addition salts thereof, wherein $Am_1$ is a member of the group consisting of 3-piperidyl, 4-piperidyl, N-lower alkyl-3-piperidyl, N-phenyl-lower alkyl-3-piperidyl, N-lower alkyl-4-piperidyl, N-phenyl-lower alkyl-4-piperidyl, 3-pyrrolidyl, N-lower alkyl-3-pyrrolidyl, N-phenyl-lower alkyl-3-pyrrolidyl, 3-quinuclidyl, 4-quinuclidyl, N-lower alkyl-3-quinuclidyl, N-lower alkyl-4-quinuclidyl, N-phenyl-lower alkyl-3-quinuclidyl and N-phenyl-lower alkyl-4-quinuclidyl, B is a lower alkylene group, and $Am_2$ is a member of the group consisting of the groups represented by $Am_1$ and 2-piperidyl, 2-pyrrolidyl, N-lower alkyl-2-piperidyl, N-phenyl-lower alkyl-2-piperidyl, N-lower alkyl-2-pyrrolidyl, N-phenyl-lower alkyl-2-pyrrolidyl, 2-quinuclidyl, N-lower alkyl-2-quinuclidyl and N-phenyl-lower alkyl-2-quinuclidyl.

2. 5-(N-methyl-4-piperidyl)-5H-dibenzo[a, d]cycloheptene.

3. 5-(N-methyl-4-piperidyl)-5H-dibenzo[a, d]cycloheptene maleate.

4. 5-(N-lower alkyl-3-piperidyl)-5H-dibenzo[a, d]cycloheptene.

5. 5-(N-lower alkyl-4-piperidyl)-5H-dibenzo[a, d]cycloheptene.

6. The process which comprises reacting a compound of the formula

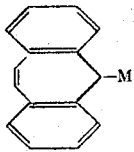

with a compound of the formulae $$X—Am_1$$

and $$X—B—Am_2$$

to produce a compound of the formulae

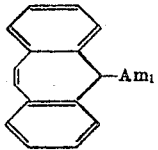

and

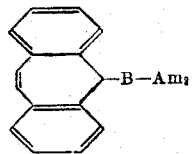

wherein X is a reactive halogen of the group consisting of chlorine, bromine and iodine, $Am_1$ is a member of the group consisting of 3-piperidyl, 4-piperidyl, N-lower alkyl-3-piperidyl, N-phenyl-lower alkyl-3-piperidyl, N-lower alkyl-4-piperidyl, N-phenyl-lower alkyl-4-piperidyl, 3-pyrrolidyl, N-lower alkyl-3-pyrrolidyl, N-phenyl-lower alkyl-3-pyrrolidyl, 3-quinuclidyl, 4-quinuclidyl, N-lower alkyl-3-quinuclidyl, N-lower alkyl-4-quinuclidyl, N-phenyl-lower alkyl-3-quinuclidyl and N-phenyl-lower alkyl-4-quinuclidyl, B is a lower alkylene group, and $Am_2$ is a member of the group consisting of the groups represented by $Am_1$ and 2-piperidyl, 2-pyrrolidyl, N-lower alkyl-2-piperidyl, N-phenyl-lower alkyl-2-piperidyl, N-lower alkyl-2-pyrrolidyl, N-phenyl-lower alkyl-2-pyrrolidyl, 2-quinuclidyl, N-lower alkyl-2-quinuclidyl and N-phenyl-lower alkyl-2-quinuclidyl, and M is a reactive alkali metal.

7. The process which comprises reacting 5-lithium-5H-dibenzo[a, d]cycloheptene with N-methyl-4-chloropiperidine in an inert organic liquid reaction medium to produce 5-(N-methyl-4-piperidyl)-5H-dibenzo[a, d]cycloheptene.

8. The process which comprises reacting 5-alkali metal-5H-dibenzo[a, d]cycloheptene with N-lower alkyl-4-halopiperidine in an inert organic liquid reaction medium to produce 5-(N-lower alkyl-4-piperidyl)-5H-dibenzo[a, d] cycloheptene.

References Cited in the file of this patent

Waldmann et al.: Justus Liebig's Annalen, vol. 609: pages 125–143 (1957).

Battersby et al.: Journal of the Chemical Society (1958), page 1988.